(No Model.)
E. L. SLOCUM.
GALVANIC BATTERY.
No. 555,058. Patented Feb. 18, 1896.
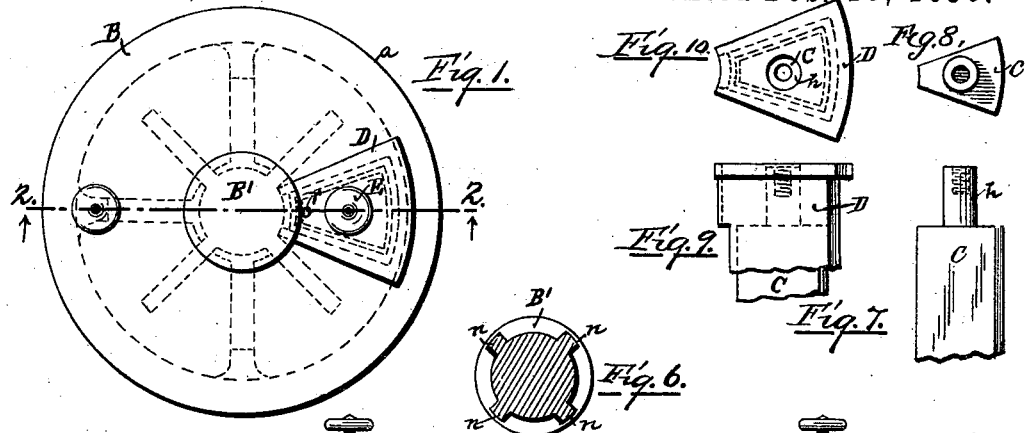
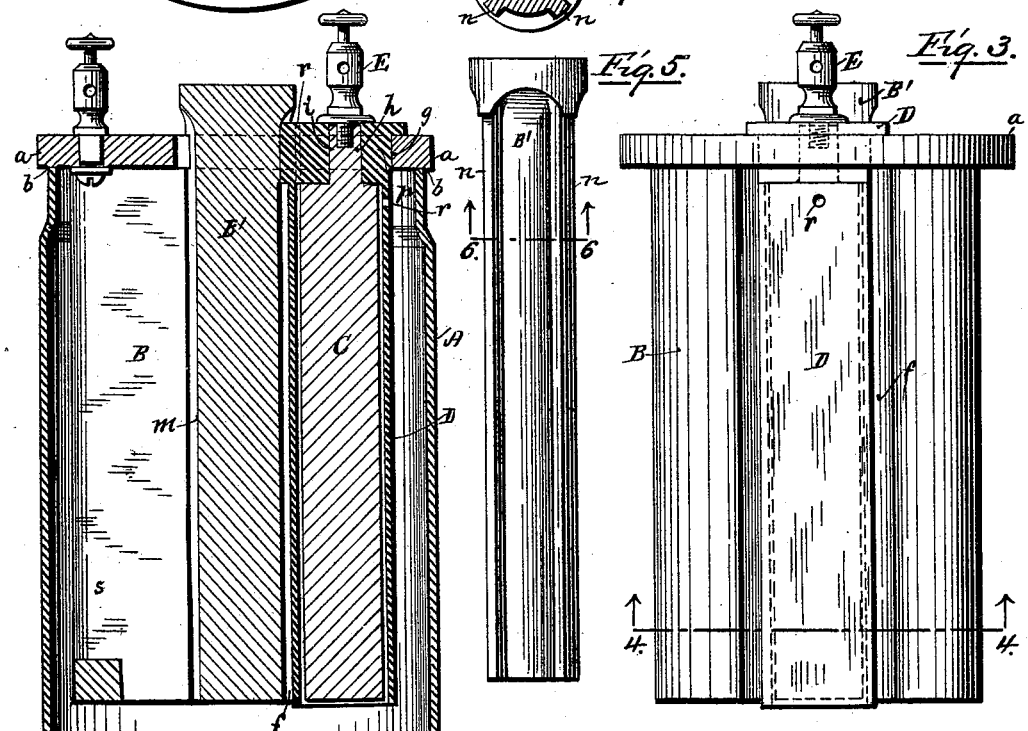
Witnesses.
Charles Hannigan.
J. Wilson McCrillis
Inventor.
Eason L. Slocum
by S. Scholfield
Atty.

UNITED STATES PATENT OFFICE.

EASON L. SLOCUM, OF PAWTUCKET, RHODE ISLAND.

GALVANIC BATTERY.

SPECIFICATION forming part of Letters Patent No. 555,058, dated February 18, 1896.

Application filed March 28, 1893. Serial No. 468,075. (No model.)

*To all whom it may concern:*

Be it known that I, EASON L. SLOCUM, a citizen of the United States, residing at Pawtucket, in the county of Providence and State of Rhode Island, have invented a new and useful Improvement in Galvanic Batteries, of which the following is a specification.

My invention consists in the improved construction and arrangement of the electrodes and the insulator for the electrodes, as hereinafter fully set forth.

Figure 1 represents a top view of a galvanic battery provided with my improvement. Fig. 2 represents a vertical section taken in the line 2 2 of Fig. 1. Fig. 3 represents a side elevation of the carbon electrode and the connected insulator for the zinc electrode. Fig. 4 represents a horizontal section taken in the line 4 4 of Fig. 3. Fig. 5 represents a side elevation of the supplementary carbon electrode. Fig. 6 represents a horizontal section taken in the line 6 6 of Fig. 5. Fig. 7 represents a detail side view of the upper portion of the zinc electrode. Fig. 8 represents a top view of the same. Fig. 9 represents a detail side view of the upper portion of the insulator. Fig. 10 represents a top view of the same.

In the accompanying drawings, A represents the outer case or jar of the battery; B, the carbon electrode; C, the zinc electrode, and D the insulator between the two electrodes.

The carbon electrode B is constructed with the flange $a$, which rests upon the edge $b$ of the jar A, and at one side of the electrode B is formed the recess $f$, adapted to receive the zinc electrode C and the insulator D, the said insulator being held in the opening $g$ in the flange $a$ of the carbon electrode.

The zinc electrode C is provided with the shank $h$, which is made shorter than the distance through the perforation $i$ in the insulator D, so that when the binding-post E is screwed into the end of the shank $h$ the zinc electrode C will be firmly attached to the insulator D.

The insulator D extends downward to the lower end of the carbon electrode B and surrounds the zinc electrode, thus preventing the electric current from passing directly from the zinc to the carbon electrode through the exciting liquid of the battery, and the insulator D is provided with an aperture $r$, located above the exciting fluid in the battery for the purpose of ventilation, and the said aperture may either communicate with the chamber $p$ above the fluid or with the external air, as shown by the dotted lines.

The carbon electrode B is provided with a central cavity $m$ and with the side openings $s\ s$ and also with the longitudinal interior grooves $d\ d$, which serve to increase the surface contact of the carbon electrode with the exciting fluid of the battery, and by means of the side openings $s\ s$ and the grooves $d\ d$ the central portion of the carbon electrode B will be provided with the longitudinal inwardly-directed ribs $o\ o$.

In the cavity $m$ of the carbon electrode B is placed the carbon electrode B', which is made of a combination of materials different from that of the carbon electrode B, and I prefer to employ the ordinary carbon for the electrode B and a mixture of plumbago and the ordinary carbon for the electrode B', the said electrode B' being provided with the flanges $n\ n$, which fit within the grooves $d$ and thus serve to form a connection with the main carbon electrode B within the fluid of the battery.

By the peculiar construction of the carbon electrode B, I am enabled to provide an extended surface for contact with the exciting fluid without the necessity of employing outwardly-projecting ribs which are liable to be broken in transportation, the longitudinal ribs $o\ o$, formed by the grooves $d$, being directed inwardly and protected from accident.

I claim as my invention—

1. The carbon electrode, provided with the flange which rests upon the top of the jaw, the recess formed at one side to receive the zinc electrode, the central cavity, the side openings, and the longitudinal interior grooves, substantially as described.

2. The combination with the carbon electrode having a central cavity, and the longitudinal ribs extending inwardly, of the supplementary carbon electrode held within the said cavity, substantially as described.

3. The combination with the carbon electrode, and the zinc electrode, of an insulator surrounding the zinc electrode on all sides within the exciting fluid, and provided with the vent-orifice above the surface of the said fluid, substantially as described.

EASON L. SLOCUM.

Witnesses:
SOCRATES SCHOLFIELD,
CHARLES HANNIGAN.